(12) United States Patent
Nakajima et al.

(10) Patent No.: US 10,452,033 B2
(45) Date of Patent: Oct. 22, 2019

(54) PROCESS CONTROL SYSTEM

(71) Applicant: YOKOGAWA ELECTRIC CORPORATION, Tokyo (JP)

(72) Inventors: Hiroaki Nakajima, Tokyo (JP); Noriko Kase, Tokyo (JP); Kiyotaka Kozakai, Tokyo (JP); Atsushi Terayama, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 311 days.

(21) Appl. No.: 15/360,199

(22) Filed: Nov. 23, 2016

(65) Prior Publication Data

US 2017/0185055 A1 Jun. 29, 2017

(30) Foreign Application Priority Data

Dec. 25, 2015 (JP) ................................. 2015-253129

(51) Int. Cl.
*G05B 13/02* (2006.01)
*H04L 12/26* (2006.01)
(52) U.S. Cl.
CPC ........ *G05B 13/022* (2013.01); *H04L 43/0852* (2013.01); *H04L 43/0858* (2013.01); *H04L 43/106* (2013.01); *G05B 2219/25256* (2013.01)
(58) Field of Classification Search
CPC ........ G05B 13/022; G05B 2219/25256; H04L 43/0852; H04L 43/0858; H04L 43/106

USPC ......................................................... 700/33
See application file for complete search history.

(56) References Cited

U.S. PATENT DOCUMENTS

| 6,094,421 A * | 7/2000 | Scott .................... H04B 7/2656 370/280 |
| 2005/0152557 A1* | 7/2005 | Sasaki .................... H04S 7/302 381/58 |
| 2008/0250162 A1* | 10/2008 | Nixon ................... H04W 76/14 710/10 |
| 2009/0046675 A1* | 2/2009 | Pratt, Jr. ............... H04W 84/18 370/337 |
| 2012/0131130 A1* | 5/2012 | Field ................... H04L 12/4035 709/217 |
| 2012/0187770 A1* | 7/2012 | Slota ........................ H02J 3/42 307/87 |
| 2015/0149662 A1 | 5/2015 | Sakamoto et al. |
| 2015/0277411 A1 | 10/2015 | Nakajima et al. |

FOREIGN PATENT DOCUMENTS

| JP | 2015-103043 A | 6/2015 |
| JP | 2015-184987 A | 10/2015 |

* cited by examiner

*Primary Examiner* — Dzung Tran
(74) *Attorney, Agent, or Firm* — Sughrue Mion, PLLC

(57) ABSTRACT

A process control system includes: a controller; at least one input and output module connected to the controller; and an allowable propagation delay value calculator in the controller, the allowable propagation delay value calculator being configured to calculate, based on the number of input and output modules connected to the controller, an allowable range for propagation delay time between the controller and the input and output module.

10 Claims, 6 Drawing Sheets

PROCESS CONTROL SYSTEM

CROSS-REFERENCE TO RELATED APPLICATION

This application claims priority from Japanese Patent Application No. 2015-253129 filed with the Japan Patent Office on Dec. 25, 2015; the entire content of which is hereby incorporated by reference.

BACKGROUND

1. Technical Field

The present disclosure relates to a process control system.

2. Description of the Related Art

In a typical process control system, a controller and a group of personal computers having a function such as a manipulation monitoring function are connected to each other via a unique control network in order to achieve real-time responsibility and high reliability.

According to a process control system provided by the technique described in JP-A-2015-184987, it is possible to obtain various information from field devices without causing a large processing load and an increase in cost.

According to an I/O module and a process control system provided by the technique described in JP-A-2015-103043, it is possible to obtain information indicative of soundness in a short time without increasing a communication load and a processing load.

SUMMARY

A process control system includes: a controller; at least one input and output module connected to the controller; and an allowable propagation delay value calculator in the controller, the allowable propagation delay value calculator being configured to calculate, based on the number of input and output modules connected to the controller, an allowable range for propagation delay time between the controller and the input and output module.

DESCRIPTION OF THE EMBODIMENTS

Figure 1:
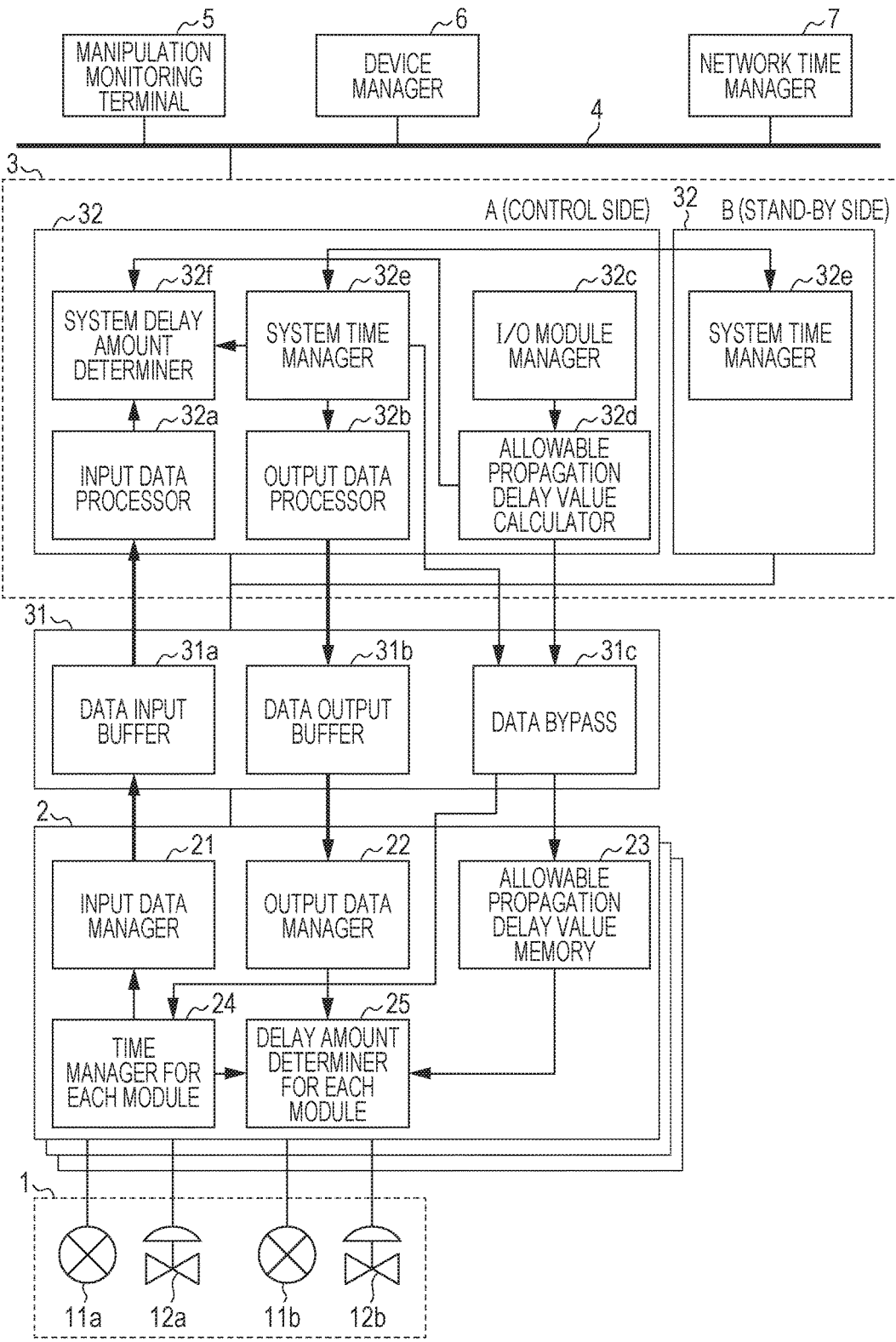
FIG. 1 is an explanatory view of a basic configuration of an embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A process control system according to a first aspect of the present disclosure (the present process control system) includes: a controller; at least one input and output module connected to the controller; and an allowable propagation delay value calculator in the controller, the allowable propagation delay value calculator being configured to calculate, based on the number of input and output modules connected to the controller, an allowable range for propagation delay time between the controller and the input and output module.

The present process control system may further include an allowable propagation delay value memory in the input and output module, the allowable propagation delay value memory being configured to store the allowable range for the propagation delay time calculated by the allowable propagation delay value calculator.

The present process control system may further include a signal repeater. The input and output module may be connected to the controller via the signal repeater.

The present process control system may further include a field device. The input and output module may include an input data manager. The signal repeater may include a data input buffer. The controller may include a system delay amount determiner and a system time manager. The input data manager may be configured to add, to input data collected from the field device, a time stamp that is time data indicating time when the input data is generated, and to write the input data having the time stamp into the data input buffer. The system delay amount determiner may be configured to calculate a difference between the time stamp added to the input data written into the data input buffer and time of the system time manager, to determine whether the difference is within the allowable range, and to determine whether the input data is appropriate or not based on the result of the determination on the difference.

In the present process control system, the controller may include an output data processor. The signal repeater may include a data output buffer. The input and output module may include an output data manager, a delay amount determiner for each module, and a time manager for each module. The output data processor may be configured to add, to output data generated by the controller, a time stamp that is time data indicating time when the output data is generated, and to write the output data having the time stamp into the data output buffer. The data output buffer may be configured to write the output data having the time stamp into the output data manager. The delay amount determiner for each module may be configured to calculate a difference between the time stamp added to the output data written into the output data manager and time data of the time manager for each module, to determine whether the difference is within the allowable range, and to determine whether the output data is appropriate or not based on the result of the determination on the difference.

The present process control system may be a safety instrumented system configured to detect abnormality in operation of a plant and to perform a control to secure safety of the plant.

In the present process control system, the controller may be configured to output, to each input and output module connected to the controller, time information having relative time accuracy.

In the present process control system, the controller may include a system time manager. The system time manager may be configured to update time of the time manager for each module in the input and output module connected to the controller.

In the present process control system, the controller may be redundant.

In a highly advanced and complexed process control for a plant, the present process control system is able to suppress an increase in cost caused by an increased number of functional points, and to perform a high-speed operation at an optimum control cycle. Thanks to the suppression of the cost increase and the high-speed operation, the present process control system is also able to improve efficiency in engineering at introduction and maintenance of the process control system.

First Embodiment

Figure 4:
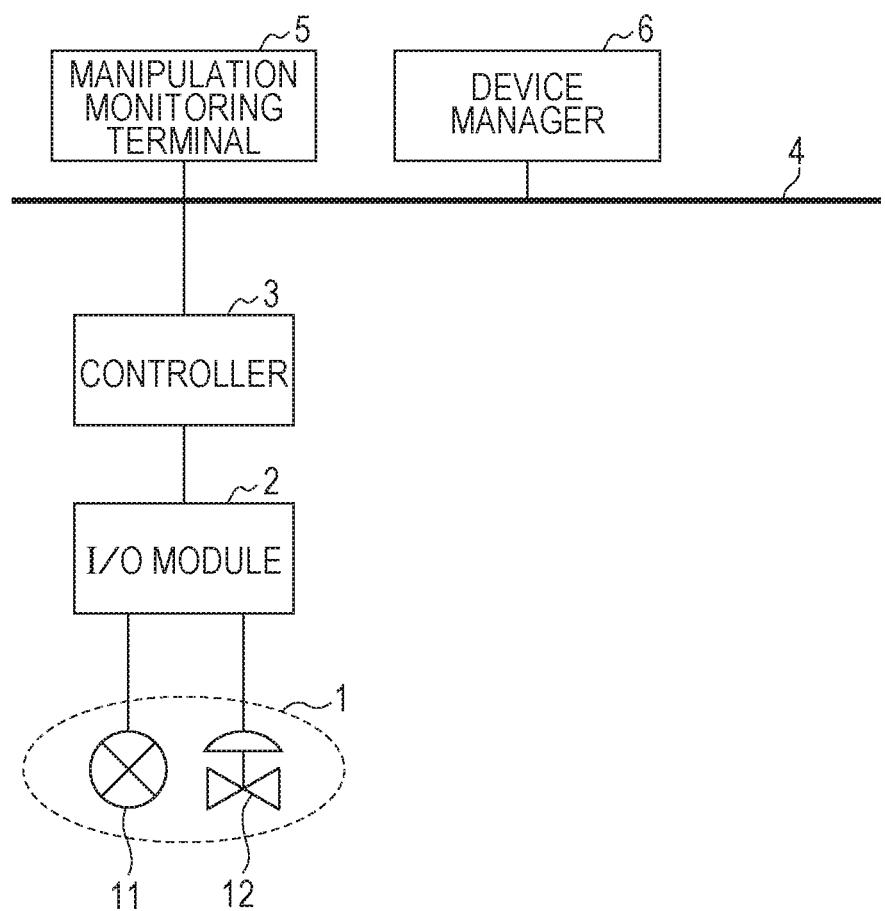
FIG. 4 is an explanatory view of a basic configuration of an example of a process control system according to further another embodiment of the present disclosure.

With reference to the drawings, the following describes details of an embodiment of the present disclosure. FIG. 4 is an explanatory view of an example of a basic configuration of a process control system according to the present embodiment. Referring to FIG. 4, a field device 1 includes elements such as a sensor 11 and an actuator 12. The field device 1 is connected to a control network 4 via an input and output module (hereinafter, also referred to as "I/O module") 2 and a controller 3. To the control network 4, a manipulation monitoring terminal 5 and a device manager 6 are also connected.

The I/O module 2 functions as an interface with a process field. Specifically, the I/O module 2 converts a signal that is from the field device 1 and is different according to the kind of field device 1 (e.g., a 4 mA to 20 mA analog signal or a digital communication signal such as an FF (Fieldbus Foundation®) signal) into a signal in a form understandable by the controller 3 (typically, into a digital signal).

Via the I/O module 2, the controller 3 obtains a measurement result of the sensor 11, which is, e.g., a flowmeter or a thermometer. The controller 3 calculates a manipulated amount of the actuator 12, which is, e.g., a valve, according to a predetermined control program. The result of the calculation (manipulated amount) supplied to the actuator 12 via the I/O module 2. According to the manipulated amount thus supplied, the actuator 12 is driven.

The controller 3 executes the calculation control process as above repeatedly at a predetermined cycle (control cycle) that has been defined in advance. As a result, a plant (see FIG. 6) is controlled so as to be in a predetermined state that is set by the control program.

The manipulation monitoring terminal 5 notifies an operator of how the plant and the controller 3 are being driven and operating. Further, the manipulation monitoring terminal 5 includes a man-machine interface via which the operator is a to manipulate and/or monitor the controller 3 if necessary.

The device manager 6 records and manages information such as statuses and maintenance information regarding operations of the field device 1 and the controller 3, which are included in the process control system.

Figure 5:
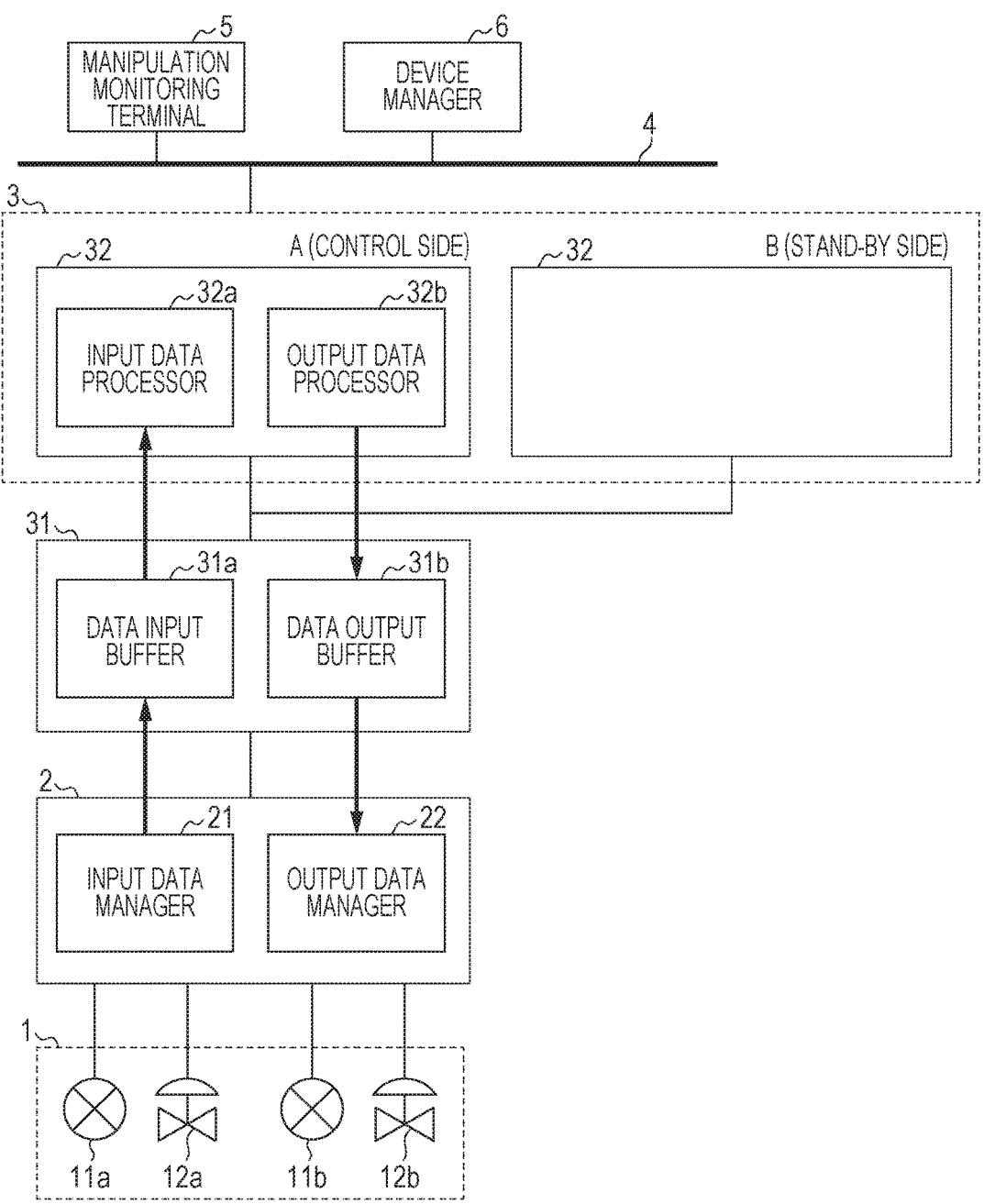
FIG. 5 is a block diagram showing greater details of the example of the process control system shown in FIG. 4.

FIG. 5 is a block diagram showing greater details of the example of the process control system of the present embodiment. This system is configured as a system having an autonomous notification function. Referring to FIG. 5, the I/O module 2 functions as the interface as described above, and includes an input data manager 21 and an output data manager 22. Consequently, the I/O module 2 has a function for autonomously notifying various information to the controller 3, which is at a higher level than the I/O module 2, the various information including information about the field device 1 connected to the I/O module 2, device management communication such as a self-diagnosis result, abnormality (change) detection communication, and/or the like.

A signal repeater 31 is configured to communicate with the I/O module 2. Further, the signal repeater 31 includes a data input buffer 31a and a data output buffer 31b.

A signal controller 32 is configured to communicate with the signal repeater 31. The controller 3 includes, for example, a signal controller 32 on a control side A and a signal controller 32 on a stand-by side B, so that the controller 3 is duplexed (redundant). Each of the signal controllers 32 includes an input data processor 32a, an output data processor 32b, and the like. Note that the signal controller 32 on the control side A and the signal controller 32 on the stand-by side B have an identical configuration. Therefore, FIG. 5 omits elements in the signal controller 32 on the stand-by side B.

Based on data from the sensor 11 (11a, 11b), the controller 3 performs calculation for a predetermined process control. The controller 3 drives the actuator 12 (12a, 12b) according to the result of the calculation, so as to control the state of the process. The process control is a core operation of the process control system. Communication for the process control is performed as control data communication at the first priority, at a fixed cycle, in real time.

For this purpose, I/O communication is performed between the controller 3 and the I/O module 2. In the configuration shown in FIG. 4, the I/O communication is typically performed according to a command-response system that is configured to cause the I/O module 2 to give a response to an input request or an output request from the controller 3.

Recently, the field device and the I/O module have been made more intelligent. This leads to a tendency to expand a variety of pieces of data from the field device, and such a variety of pieces of data are often handled integrally. For example, the data from the field device includes, in addition to process data of 4 mA to 20 mA that is handled by an analog device, prediction and maintenance information indicative of, e.g., a self-diagnosis result and an anomalous change of the field device, wireless data, and data of other companies' systems.

If such a wide variety of pieces of information that have different data structures and different update cycles are collected in real time according to the command-response system, the load on the I/O communication increases. In order to avoid this, according to the configuration shown in FIG. 5, the field device 1 or the I/O module 2 itself autonomously notifies various information to the controller 3, which is at a higher level than the field device 1 and the I/O module 2, the various information including device management communication such as communication indicative of self-diagnosis result information, communication indicative of detection of an anomalous change, and/or the like (hereinafter, such notification is referred to as "autonomous notification").

During this process, in order to avoid a load on the controller 3, the information to be autonomously notified is not directly notified to the controller 3. Instead, the information is notified to the controller 3 via the signal repeater 31. The signal repeater 31 includes the data input buffer 31a. The data input buffer 31a has a function to temporarily store the information therein for buffering.

The signal repeater 31 (data input buffer 31a) has information of at least one I/O module 2. The information in the signal repeater 31 (data input buffer 31a) is updated in real time by the autonomous notification from the I/O module 2. The controller 3 (input data processor 32a) gains access to the signal repeater 31 (data input buffer 31a) at an arbitrary timing, so as to collect information from a plurality of I/O modules 2 connected to the signal repeater 31.

Meanwhile, output data is transmitted to the I/O module 2 at a timing of the signal repeater 31 itself. As a result, a reduction in the load on the controller 3 is expectable.

Furthermore, communication between the signal repeater 31 and the I/O module 2 does not include a command-response notification for data that is not updated yet. Therefore, the signal repeater 31 and the I/O module 2 can be connected to each other via a low-speed bus. Thus, a merit in terms of cost-effectiveness is also expectable.

Figure 6:
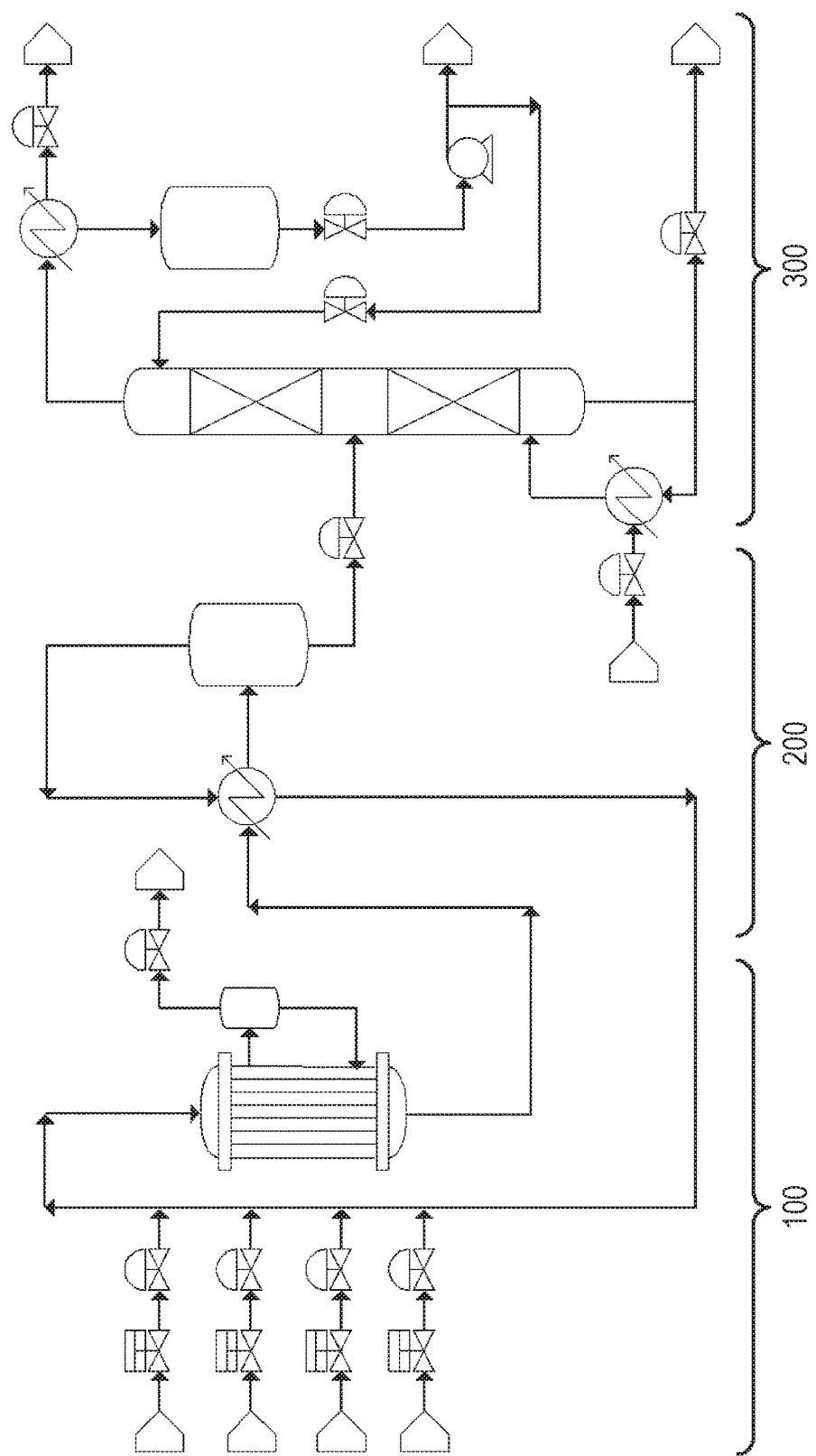
FIG. 6 shows an example of a configuration of a process plant.

FIG. 6 shows an example of a configuration of a process plant. In the process plant, in most cases, even for production of a product of a single kind, a plurality of steps (a plurality of units) is performed. In the example shown in FIG. 6, a reaction unit (reactor unit) 100, a gas-liquid separation unit (gas-liquid separator unit) 200, and a distillation column unit 300 are arranged in this order. These units perform unit steps including three steps.

Second Embodiment

In order to improve quality of a product produced by the plant and production efficiency, the units of the process plant are preferably controlled with higher accuracy on a unit basis. In order to realize the controls with higher accuracy, it is preferable to increase the number of measurement points and/or manipulation points, and/or to control each of the units at a speed optimum for the unit.

For example, for a unit for performing a slow chemical reaction, a control cycle is set to be long. As a result, the number of measurement points and/or manipulation points can be increased, and thus the unit can be controlled with higher accuracy.

Meanwhile, for a unit for performing a fast chemical reaction, a control cycle is set to be short in order to perform the reaction as quickly as possible.

The increase in the number of measurement points and/or manipulation points leads to an increase in cost of the process control system. In order to suppress deterioration of control performance caused by the increase in the number of measurement points and/or manipulation points per controller, for example, the technique as those described in JP-A-2015-184987 (described above) has been proposed.

Here, a typical control cycle is one second, for example. However, for some units, it is necessary to perform a control at a high speed, for example, at a control cycle of 50 ms. Specifically, the unit for performing a fast chemical reaction is preferably shut down fast in response to occurrence of abnormality, even if this unit is included in a safety instrumented system designed to secure safety.

In the configuration shown in FIG. 5, there is a case where wrong data is used in I/O communication between the controller 3 and the I/O module 2. As one of the typical causes of this, occurrence of a delay is known. One measure to reduce the delay is a method of checking, at both ends of the communication, a difference between update counters at both the ends, for example.

According to the method of checking, at both ends of the communication, a difference between update counters at both the ends, it is possible to check whether the data has been updated. However, according to this method, it is difficult to guarantee that the checked data is real-time data. Thus, it cannot be said that this method is able to detect the delay. Such a communication delay gives a great effect especially on demand-to-reaction time. The demand-to-reaction time, which is requested by the safety instrumented system, indicates a response quality from abnormality detection to shutdown.

Further, performing communication via the signal repeater 31 as shown in FIG. 5 is likely to cause a delay in the communication. To be specific, when the signal repeater 31 receives input data notified by the I/O module 2, the signal repeater 31 does not immediately transmit the input data to the controller 3, which is at a higher level than the signal repeater 31. Instead, the signal repeater 31 temporarily buffers the input data until the signal repeater 31 receives an inquiry from the controller 3.

As a result, in some cases, the input data in the signal repeater 31 (data input buffer 31*a*) is transmitted to the controller 3 as delayed input data that does not reflect a real-time actual state of the field.

Meanwhile, in some cases, output data transmitted from the controller 3 (output data processor 32*b*) to the I/O module 2 via the signal repeater 31 (data output buffer 31*b*) might be past output data having a value deviated from a setting value intended by the controller 3. If wrong input/output data is used, a spurious trip might occur in a worst case.

In order to avoid this, some applications employ PLC (Programmable Logic Controller) only in a part in which a high-speed control processing is necessary. However, in order to ensure the high-speed processing, PLC typically employs a command-response system, which has a simple configuration.

Thus, it is difficult to increase the number of measurement points and/or manipulation points per PLC. Further, it is also difficult to perform a complex control calculation such as a PID (Proportional integral and Differential) calculation.

Furthermore, when viewing this system as a whole, a step for a product of a single kind has one part that is processed by DCS (Distributed Control System) (or SIS (Safety Instrumented System)), and has another part that is processed by PLC. This complicates the engineering of the system. As a result, it is difficult to suppress deterioration in cost-effectiveness and quality at introduction and maintenance of the system.

The present embodiment discloses a process control system as below. That is, in a highly advanced and complexed process control for a plant, the process control system is able to suppress an increase in cost caused by an increased number of functional points or diversification, and to achieve high reliability and flexibility of capable of dealing with various control cycles. Further, thanks to the suppression of the cost increase and the achievement of the high reliability and flexibility, the process control system is able to improve efficiency in engineering at introduction and maintenance of the process control system.

FIG. 1 an explanatory view of a basic configuration of the present embodiment. In FIG. 1, elements that are similar to or related to elements in FIG. 5 have identical reference signs to those of FIG. 5.

In FIG. 1, a control network 4 is connected with an I/O module (input and output module) 2 via a controller 3 and a signal repeater 31, which is configured to receive data from the I/O module 2. The I/O module 2 is configured as an autonomous I/O module that has a function for performing autonomous notification of data in order to form a process control system or a safety instrumented system. The control network 4 is connected with at least one manipulation monitoring terminal 5, and at least one controller 3. Further, the control network 4 is also connected with a network time manager 7 and a device manager 6.

The I/O module 2 includes an allowable propagation delay value memory 23, a time manager 24 for each module, and a delay amount determiner 25 for each module, in addition to an input data manager 21 and an output data manager 22 shown in FIG. 5.

The signal repeater 31 is configured to communicate with the I/O module 2. The signal repeater 31 includes a data bypass 31c, in addition to a data input buffer 31a and a data output buffer 31b shown in FIG. 5.

The controller 3 includes a signal controller 32 on a control side A and a signal controller 32 on a stand-by side B, which have an identical configuration. Namely, the controller 3 is duplexed (redundant) by the signal controller 32 on the control side A and the signal controller 32 on the stand-by side B, which have an identical configuration. The signal controller 32 on the control side A includes an I/O module manager 32c, an allowable propagation delay value calculator 32d, a system time manager 32e, and a system delay amount determiner 32f, in addition to an input data processor 32a and an output data processor 32b shown in FIG. 5. Since the signal controller 32 on the control side A and the signal controller 32 on the stand-by side B have an identical configuration, FIG. 1 omits part of the elements in the signal controller 32 on the stand-by side B.

For example, when the I/O module 2 updates measurement data from the sensor 11 (11a, 11b), the I/O module 2 autonomously notifies input data to the signal repeater 31. Upon reception of the input data, the signal repeater 31 updates the data input buffer 31a in the signal repeater 31.

Meanwhile, when the controller 3 transmits a setting value or a manipulation value to an actuator (12a, 12b), the signal repeater 31 updates data in the data output buffer 31b.

When internal information (for example, the data in the data output buffer 31b) is updated, the signal repeater 31 transmits output data to a corresponding I/O module 2 at its own processing timing.

At a predetermined cycle, the I/O module 2 collects data from the field device 1 and updates the data input buffer 31a in the signal repeater 31. Further, according to an output request from the controller 3, the I/O module 2 outputs the setting value or the manipulation value to the field device 1 via the data output buffer 31b.

The time manager 24 for each module and the system time manager 32e are provided so as to allow the I/O module 2 and the controller 3 to take relative time synchronization.

The time manager 24 for each module and the system time manager 32e respectively include clocks for measuring time with a predetermined resolution. Via the signal repeater 31 at a fixed cycle, the controller 3 (system time manager 32e) outputs (broadcasts) information (time information having relative time accuracy) of its own clock to each of I/O modules 2 that are connected to the controller 3.

The broadcasting may be distributed (updated) independently of a communication frequency of input/output data. Thus, the broadcasting is performed via the data bypass 31c in the signal repeater 31. The data bypass 31c is configured to allow data to pass therethrough without storing the data therein. Therefore, the broadcasting communication hardly becomes a cause of a delay.

The time information of the clock of the time manager 24 for each module in the I/O module 2 is updated by the broadcasting by the controller 3 (system time manager 32e). Namely, the system time manager 32e (controller 3) updates the time of the time manager 24 for each module in the I/O module 2 that is connected to the controller 3. Thus, the time of the controller 3 (system time manager 32e) and the time of all the I/O modules 2 (time managers 24 for each module) are synchronized to an identical value that is within a predetermined allowable deviation range. It is not necessary that the time of the clock in the time manager 24 for each module be absolute time. Further, it is not necessary that the time of the clock in the time manager 24 for each module be synchronized with the time of another controller connected to the control network 4.

In the I/O module manager 32c, data indicative of the number of I/O modules 2 connected to the controller 3 is stored. Based on the data indicative of the number of I/O modules 2 connected to the controller 3, the allowable propagation delay value calculator 32d calculates an allowable propagation delay range (an allowable range for propagation delay time between the controller 3 and the I/O module 2) for the time information. The result of the calculation is stored in the allowable propagation delay value memory 23 in the I/O module 2.

In the configuration shown in FIG. 1, the signal controller 32 is duplexed (redundant) by the signal controller 32 on the control side A and the signal controller 32 on the stand-by side B, which have an identical configuration. Therefore, the signal controller 32 on the control side A (operation side) and the signal controller 32 on the stand-by side B have an identical time value. For example, the signal controller 32 on the stand-by side B updates its own time information by referring to time of the signal controller 32 on the control side A. With this, the synchronized state can be maintained even if switching between the signal controller 32 on the control side and the signal controller 32 on the stand-by side is performed due to, e.g., occurrence of abnormality in the signal controller 32 on the control side A.

Figure 2:
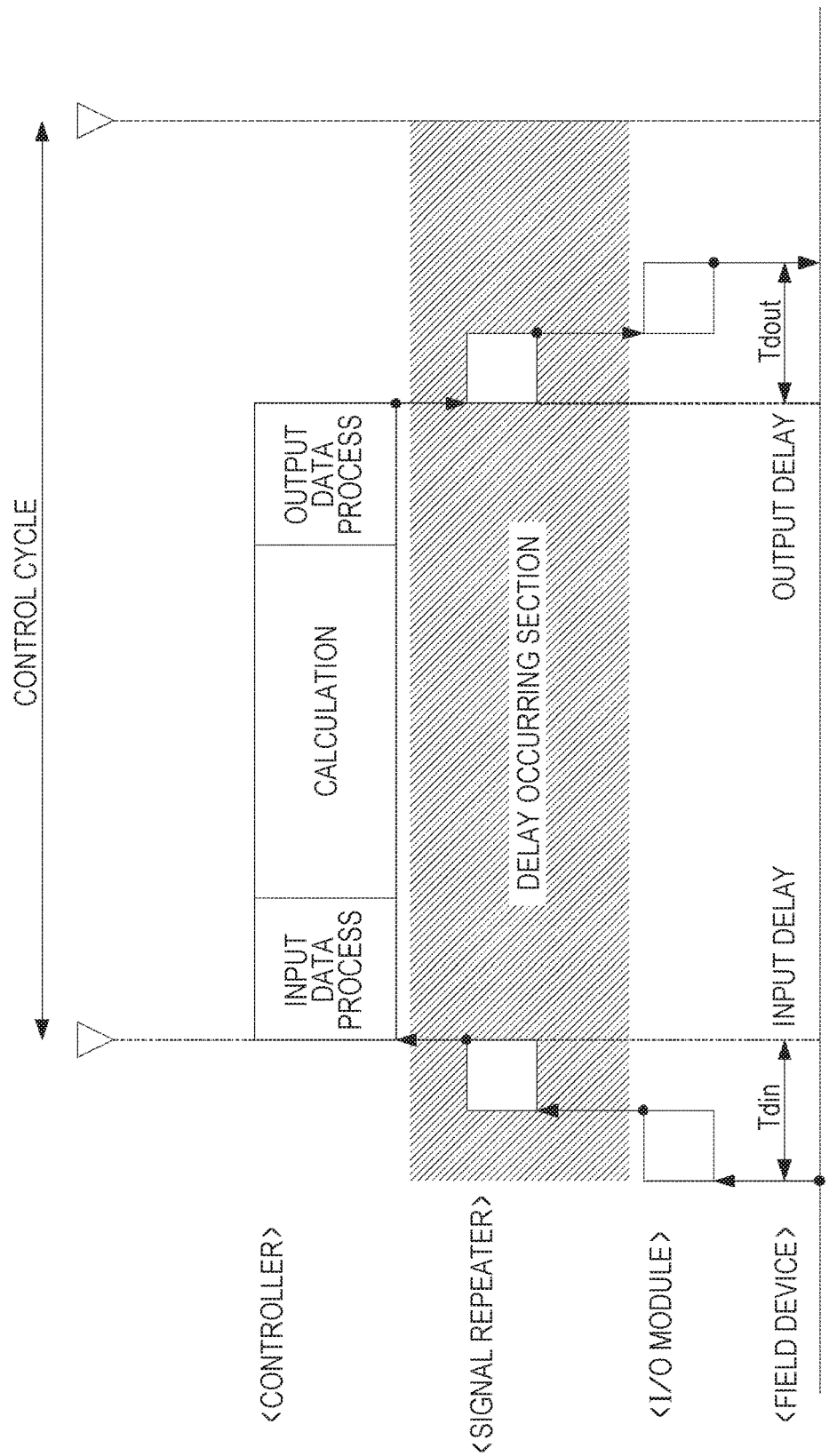
FIG. 2 shows an example of an operation sequence of the embodiment shown in FIG. 1.

FIG. 2 shows an example of an operation sequence of the present embodiment. The system shown in FIG. 1 performs an input process (input data process), calculation, and output process (output data process) repeatedly in this order at a predetermined control cycle. The input data manager 21 in the I/O module 2 adds, to data collected from the field device 1, time data indicating time when the data is generated (hereinafter, such time data is referred to as "time stamp"). Further, the input data manager 21 writes the data having the time stamp into the data input buffer 31a in the signal repeater 31.

The system delay amount determiner 32f in the controller 3 makes a comparison between the time stamp added to the input data written into the data input buffer 31a in the signal repeater 31 and time of the system time manager 32e in the controller 3 (i.e., calculates a difference between the time stamp and the time of the system time manager 32e). If the calculated difference (input delay Tdin in FIG. 2) is within a predetermined allowable range, the system delay amount determiner 32f determines that the data is good input data not involving a delay. In this case, the controller 3 performs calculation with use of the input data.

If the difference between the time stamp of the input data and the reference time is outside the allowable range, the controller 3 (system delay amount determiner 32f) rejects (discards) the input data, and the input data is not used for calculation. Further, a shutdown process is initiated, in a case where the process control system of the present embodiment is a safety instrumented system.

That is, the system delay amount determiner 32f calculates a difference between the time stamp added to the input data written into the data input buffer 31a and the time of the system time manager 32e, determines whether the difference is within the allowance range, and determines whether the input data is appropriate or not (good or not) based on the result of the determination on the difference.

Note that the safety instrumented system is configured to detect abnormality in operation of a plant and to perform a control to secure safety of the plant.

In a process in which the controller 3 outputs, to the I/O module 2, a manipulation value (output data generated by the controller 3) calculated by the controller 3, the output data processor 32b in the controller 3 adds, to output data generated by the controller 3, a time stamp that is time data indicating time when the data is generated. Then, the output data processor 32b writes the output data having the time stamp into the data output buffer 31b in the signal repeater 31.

When the output data in the data output buffer 31b in the signal repeater 31 is updated, the data output buffer 31b writes the output data into the output data manager 22 in a corresponding I/O module 2 at a timing of the signal repeater 31.

The delay amount determiner 25 for each module in the I/O module 2 makes a comparison between the time stamp added to the output data written into the output data manager 22 and time data of the time manager 24 for each module in the I/O module 2 (i.e., calculates a difference between the time stamp and the time data). If the difference (output delay Tdout in FIG. 2) is within an allowable range stored in the allowable propagation delay value memory 23 in the I/O module 2, the delay amount determiner 25 for each module determines that the data is good output data not involving a delay. In this case, the I/O module 2 outputs the output data to the field device 1.

If the difference between the time stamp of the output data and the reference time is outside the allowable range, the I/O module 2 (delay amount determiner 25 for each module) rejects (discards) the data, and the output data is not output to (reflected in) the field device 1. Further, a shutdown process is initiated, in a case where the process control system of the present embodiment is a safety instrumented system.

That is, the delay amount determiner 25 for each module in the I/O module 2 calculates a difference between the time stamp added to the output data written into the output data manager 22 and time data of the time manager 24 for each module, determines whether the difference is within the allowable range, and determines whether the output data is appropriate or not (good or not) based on the result of the determination on the difference.

Each of the allowable ranges (the values of the allowable ranges) for the propagation delay time retained by the controller 3 and the I/O module 2 varies depending on the number of I/O modules 2 connected to the controller 3. The reason for this is given as follows. Output data from the controller 3 is communicated to the I/O module 2 by unicast. Therefore, when the number of I/O modules 2 connected to the controller 3 is large, there occurs a difference (a delay in the controller) between time when the controller 3 generates the output data and time when transmission of the output data to all the I/O modules 2 completes. Thus, in this case, the allowable range for the propagation delay time becomes greater.

Thus, the delay in the controller 3 is information used by each of the I/O modules 2 to determine the allowable range (the values of the allowable range) for the propagation delay time. In a case where the process control system of the present embodiment is a safety instrumented system, it is preferable that the delay in the controller 3 be a value that does not give any effect on the demand-to-reaction time.

According to the known techniques, it is difficult for one I/O module to know the number of other I/O modules connected to a controller to which the one I/O module is connected. Namely, it is difficult for the I/O module to set an appropriate allowable range for propagation delay time.

Therefore, the allowable range for the propagation delay time is calculated and set, for example, based on a maximum number of I/O modules connectable to the controller.

According to the present embodiment, the controller 3 knows the number of I/O modules 2 connected to the controller 3. Further, the controller 3 calculates an appropriate allowable range (values of an allowable range) for propagation delay time by use of the allowable propagation delay value calculator 32d. The controller 3 (allowable propagation delay value calculator 32d) causes the allowable range (the values of the allowable range) to be transmitted (downloaded) to the allowable propagation delay value memory 23 in the I/O module 2 as setting information. If the number of I/O modules 2 connected to the controller 3 is changed, the allowable propagation delay value calculator 32d in the controller 3 calculates an appropriate allowable range (values of an allowable range) for propagation delay time appropriately. Further, the allowable propagation delay value calculator 32d causes the allowable range (the values of the allowable range) to be transmitted (downloaded) to the allowable propagation delay value memory 23 in each of the I/O modules 2 again. Thus, it is possible to perform the delay diagnosis based on the appropriate allowable range (the values of the allowable range) for the propagation delay time at any time.

As described in the present embodiment, the controller 3 provides each of the I/O modules 2 with an appropriate allowable range (values of an allowable range) for propagation delay time, so that the delay diagnosis is performed. As a result, it is possible to reduce erroneous operation.

Incidentally, in some cases, another process control system has a part in which a fast reaction is performed, and the part is processed by PLC. In the part processed by PLC, a data collection cycle is some ms. Therefore, if network time (having ms-order accuracy) is used as reference time, it is difficult to achieve μs-order accuracy.

Meanwhile, according to the present embodiment, communication of input/output data is performed between the controller 3 and the I/O module 2, and therefore absolute time is not necessary for the delay diagnosis. As described above, according to the present embodiment, the clock of the system time manager 32e in the controller 3 is set as reference time, and the system time manager 32e supplies time data to each of the I/O modules 2. Then, the delay diagnosis part (the system delay amount determiner 32f, the delay amount determiner 25 for each module) determines, by use of the relative time, whether subject data is good or not. The clock of the system time manager 32e in the controller 3 has μs-order accuracy. Therefore, it is possible to achieve sufficient time accuracy even for data that is input/output at a high speed, such as data that is processed by PLC.

Further, since the clock of the system time manager 32e in the controller 3 is set as reference, all of the I/O modules 2 connected to the controller 3 are synchronized to time of the clock. Even if abnormality occurs in the network time; the controller 3 and members at a lower level than the controller 3 (i.e., the controller 3 and members connected to the controller 3) are able to be continuously controlled independently of a part managed by another controller 3.

Typically, in many cases, controllers are allocated to respective units. According to the present embodiment, even if network abnormality occurs, a control in each unit is continuously performed. This enhances safety in operation on a unit basis.

The following summarizes subjects that the present embodiment addresses and solutions given by the present embodiment.

Subject 1

It is preferable to increase the number of I/O modules per controller, while suppressing facility cost. According to the known techniques, for example, as described in JP-A-2015-184987, the signal repeater (buffer) is provided to deal with the increased number of I/O modules. However, buffering causes a delay in input/output data. If a large delay occurs, erroneous operation may be caused. Thus, it is preferable to detect the delay to avoid the erroneous operation.

Solution 1

In order to deal with this, according to the present embodiment, the controller 3 and the I/O module 2 are respectively provided with the delay amount determiners (the system delay amount determiner 32f, the delay amount determiner 25 for each module), and data that is outside the predetermined allowable range for the propagation delay time is discarded. If data is discarded in a unit processed by SIS, operation of the unit is shut down. In a unit processed by FCS (Field Control Station), updating of input/output data is not performed, and preceding data used prior to the data having been subjected to the delay diagnosis is continuously used.

Subject 2

It is preferable to increase the accuracy in the determination of the propagation delay time. According to the known techniques, the signal repeater is provided so that a large number of I/O modules (e.g., 100 I/O modules) can be connected to the controller. However, increasing the number of I/O modules connected to a single controller leads to an increase in propagation delay time of each input/output data due to, e.g., an increase in an amount of unicast communication. Thus, according to the known techniques, the allowable range for the propagation delay time is determined in consideration of a maximum number of I/O modules connectable to the controller.

However, in another practical plant, this allowable range for the propagation delay time (i.e., the allowable range for the propagation delay time according to a maximum number of I/O modules 2 connectable to the controller 3) is too large for a part in which a small number of inputs and outputs are performed at a high speed, such as the part that is processed by PLC. As a result, according to the known techniques, even if wrong data exists, the wrong data cannot be a subject to be discarded (i.e., the wrong data cannot be detected).

Solution 2

According to the present embodiment, the controller 3 knows the number of I/O module 2 connected to the controller 3. Further, the controller 3 is provided with the allowable propagation delay value calculator 32d. The controller 3 (allowable propagation delay value calculator 32d) calculates an appropriate allowable range (values of an allowable range) for propagation delay time appropriately. Further, the controller 3 (allowable propagation delay value calculator 32d) notifies the calculated allowable range (the values of the allowable range) to the I/O modules 2 connected to the controller 3. Each of the I/O modules 2 includes the allowable propagation delay value memory 23 configured to store the allowable range (the values of the allowable range) therein. In each of the I/O modules 2, the allowable range (the values of the allowable range) is used as a threshold by the delay amount determiner 25 for each module to determine whether a delay amount for each module is good or not.

Subject 3

It is preferable to increase the time accuracy for the delay diagnosis in the part in which a high-speed processing is necessary. The part in which a small number of inputs and outputs are performed at a high speed and which is processed by PLC currently has a data collection cycle of some ms. Further, the network time that is set as the reference time currently has ms-order accuracy. Therefore, it is difficult to achieve high accuracy.

Solution 3

According to the present embodiment, communication of input/output data is performed between the controller 3 and the I/O module 2, and therefore absolute time is not necessary. The system time manager 32e in the controller 3 includes a reference clock, from which time data is supplied to the I/O module 2. Thus, relative time is used to determine whether a delay amount is good or not. The reference clock in the controller 3 has µs-order accuracy (clock accuracy). Therefore, it is possible to achieve sufficient time accuracy even for high-speed input/output that is comparable to that of PLC.

According to the present embodiment, communication propagation delay time between the controller 3 and the I/O module 2 is diagnosed and determined. As a result, it is possible to suppress the use of abnormal data caused by, for example, propagation delay. This makes it possible to enhance stability and safety of the system.

According to the present embodiment, based on the number of I/O modules 2 connected to the controller 3, the controller 3 calculates an appropriate allowable delay time deviation, and notifies the appropriate allowable delay time deviation to the I/O module 2, which is at a lower level than the controller 3. Consequently, it is possible to perform the diagnosis of the communication delay time in a stable manner, irrespective of the number of I/O modules 2 connected to the controller 3. When the number of I/O modules 2 connected to the controller 3 is small, it is possible to perform the diagnosis of the propagation delay with further higher accuracy.

According to the present embodiment, the reference clock is included in the controller 3. This makes it possible to perform high-speed processing that is comparable to that of PLC. Furthermore, replacing the PLC part of the known techniques with a device according to the present embodiment eliminates the engineering procedures for PLC.

Furthermore, even if abnormality occurs in the network (time) and/or the like, the controller 3 and the members at a lower level than the controller 3 are able to be continuously controlled, independently of other units.

Figure 3:
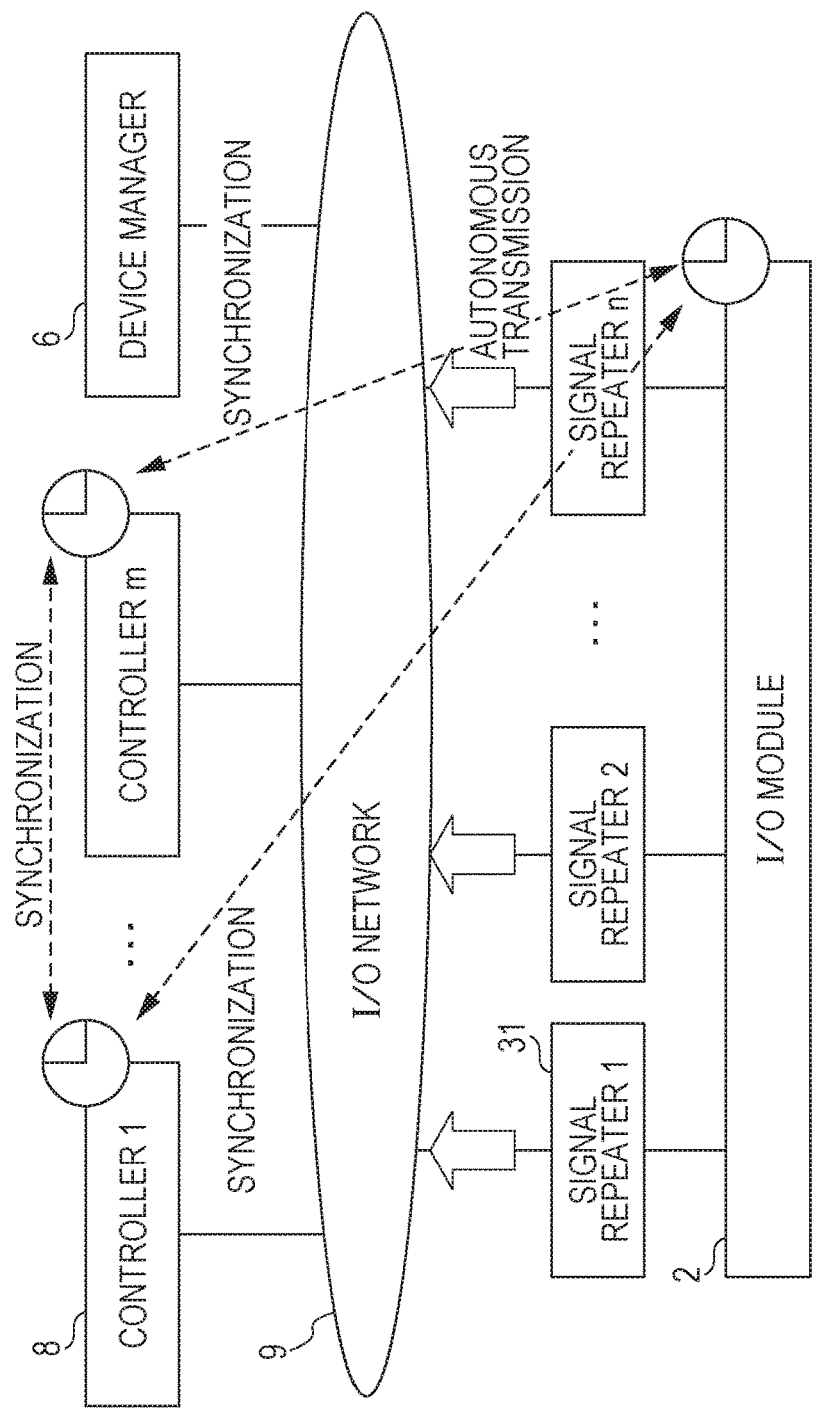
FIG. 3 is an explanatory view of a configuration of another embodiment of the present disclosure.

FIG. 3 is an explanatory view of a configuration of another embodiment of the present disclosure. According to this embodiment, signal repeaters 31 perform autonomous transmission. Referring to FIG. 3, the plurality of signal repeaters 31 is connected with a plurality of controllers 8 and a device manager 6 commonly via an I/O network 9. The plurality of controllers 8 is in synchronization with an I/O module 2. Consequently, it is possible to detect a delay in input data from the I/O module 2, in a state where the input data is shared by the plurality of controllers 8. The signal repeaters 31 autonomously communicate with the I/O network 9.

Further, the I/O module 2 is able to detect a delay in output data from the plurality of controllers 8, irrespective of the source of the data.

As described above, according to the present embodiment, it is possible to provide a process control system as below. That is, in a highly advanced and complexed process control for a plant, the process control system is able to suppress an increase in cost caused by an increased number of functional points, and to perform a high-speed operation an optimum control cycle. Thanks to the suppression of the cost increase and the high-speed operation, the process control system is also able to improve efficiency in engineering at introduction and maintenance of the process control system.

Embodiments of the present disclosure relate to a process control system. Specifically, the embodiments of the present disclosure relate to delay diagnosis for communication in the system. Note that the process control systems according to the embodiments of the present disclosure include a safety instrumented system configured to detect abnormality in operation of a plant and to perform a control to secure safety of the plant.

Embodiments of the present disclosure may be the following first to sixth process control systems below.

The first process control system is a process control system including a controller to which an input and output module is connected, the controller including a part configured to calculate an allowable range for propagation delay time according to the number of input and output modules connected to the controller.

The second process control system is the first process control system configured such that in the process control system including the controller the input and output module is connected, the controller includes the part configured to calculate the allowable range for the propagation delay time according to the number of input and output modules connected to the controller and the input and output module includes a part configured to store, in the part, values of the allowable range for the propagation delay time calculated by the controller.

The third process control system is the first or second process control system configured such that the input and output module is connected to the controller via a signal repeater.

The fourth process control system is any one of the first to third process control systems configured such that the process control system is a safety instrumented system configured to detect abnormality in operation of a plant and to perform a control to secure safety of the plant.

The fifth process control system s any one of the first to fourth process control systems configured such that the controller is configured to output, to each input and output module connected to the controller, time information having relative time accuracy.

The sixth process control system is any one of the first to fifth process control systems configured such that the controller is redundant.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A process control system for a plant, which is a safety instrumented system that detects an abnormality in an operation of the plant and performs a control to secure safety of the plant, comprising:

a controller comprising at least one processor executing at least one program;

at least one input and output module connected to the controller; and an allowable propagation delay value calculator in the controller, the allowable propagation delay value calculator calculating, based on the number of input and output modules connected to the controller, an allowable range for propagation delay time between the controller and the input and output module, wherein the controller is operated at a predetermined control cycle and performs a delay diagnosis based on a value of the allowable range for the propagation delay time and performs a control to secure safety of the plant.

2. The process control system according to claim 1, further comprising an allowable propagation delay value memory in the input and output module, the allowable propagation delay value memory storing the allowable range for the propagation delay time calculated by the allowable propagation delay value calculator.

3. The process control system according to claim 1, further comprising a signal repeater, wherein the input and output module is connected to the controller via the signal repeater.

4. The process control system according to claim 3, further comprising a field device, wherein the input and output module includes an input data manager, the signal repeater includes a data input buffer, the controller includes a system delay amount determiner and a system time manager, the input data manager adds, to input data collected from the field device, a time stamp that is time data indicating time when the input data is generated, and writes the input data having the time stamp into the data input buffer, and the system delay amount determiner calculates a difference between the time stamp added to the input data written into the data input buffer and time of the system time manager, to determine whether the difference is within the allowable range, and to determine whether the input data is appropriate or not based on the result of the determination on the difference.

5. The process control system according to claim 2, further comprising a signal repeater, wherein the input and output module is connected to the controller via the signal repeater.

6. The process control system according to claim 5, further comprising a field device, wherein the input and output module includes an input data manager, the signal repeater includes a data input buffer, the controller includes a system delay amount determiner and a system time manager, the input data manager adds, to input data collected from the field device, a time stamp that is time data indicating time when the input data is generated, and writes the input data having the time stamp into the data input buffer, and the system delay amount determiner calculates a difference between the time stamp added to the input data written into the data input buffer and time of the system time manager, to determine whether the difference is within the allowable range, and to determine whether the input data is appropriate or not based on the result of the determination on the difference.

7. The process control system according to claim 5, wherein the controller includes an output data processor, the signal repeater includes a data output buffer, the input and output module includes an output data manager, a delay amount determiner for each module, and a time manager for each module, the output data processor adds, to output data generated by the controller, a time stamp that is time data indicating time when the output data is generated, and writes the output data having the time stamp into the data output buffer, the data output buffer is configured to write the output data having the time stamp into the output data manager, and the delay amount determiner for each module calculates a difference between the time stamp added to the output data written into the output data manager and time data of the time manager for each module, to determine whether the difference is within the allowable range, and to determine whether the output data is appropriate or not based on the result of the determination on the difference.

8. The process control system according to claim 1, wherein the controller outputs, to each input and output module connected to the controller, time information having relative time accuracy.

9. The process control system according to claim 7, wherein the controller includes a system time manager, and the system time manager updates time of the time manager for each module in the input and output module connected to the controller.

10. The process control system according to claim 1, wherein the controller is redundant.

* * * * *